United States Patent [19]

Tischer

[11] Patent Number: 5,010,679
[45] Date of Patent: Apr. 30, 1991

[54] FISHING LURE AND FISH HOOK

[76] Inventor: Michael M. Tischer, 725 N. West St., Dover, Del. 19901

[21] Appl. No.: 461,291

[22] Filed: Jan. 5, 1990

[51] Int. Cl.$^5$ ............................................ A01K 85/00
[52] U.S. Cl. ........................................ 43/42.04; 43/35
[58] Field of Search .................. 43/34, 35, 37, 42.44, 43/42.41, 42.4, 42.04

[56] References Cited

U.S. PATENT DOCUMENTS

| | | | |
|---|---|---|---|
| 1,588,690 | 6/1926 | Babbitt | 43/35 |
| 1,694,697 | 12/1928 | Beidatsch | 43/37 |
| 2,474,481 | 6/1949 | Kleppen et al. | 43/35 |
| 2,543,501 | 2/1951 | Kleppen et al. | 43/35 |
| 2,900,753 | 8/1954 | Griffith | 43/37 |
| 3,025,628 | 3/1962 | Marawski | 43/35 |
| 3,411,233 | 11/1968 | Hopper | 43/35 |
| 3,497,985 | 3/1970 | Margulies | 43/42.4 |
| 3,868,784 | 3/1975 | Sobol | 43/42.37 |

Primary Examiner—Kurt Rowan
Assistant Examiner—James Miner
Attorney, Agent, or Firm—Berman, Aisenberg & Platt

[57] ABSTRACT

A pivot system used in a weedless fishing lure enables the barbed point to be exposed only when a fish strikes the lure. The hook eye is restrained by a resilient band, such as an elastic band, on the outside of the lure. Alternatively, the hook is contained within the lure body. The barbed point is concealed within a slot in the lure until a fish strikes the lure, at which time tension is put on the line and the fish hook is rotated so that the barbed point is revealed. The fishing line is attached to a portion of the fish hook, extending from the shank, positioned in the slot through the lure. A fish hook used with the lure has an arm extending from the shank to which the line is attached.

13 Claims, 2 Drawing Sheets

FISHING LURE AND FISH HOOK

FIELD OF THE INVENTION

The invention relates to a weedless fishing lure and a fish hook for use therewith.

BACKGROUND OF THE INVENTION

Known fishing lures which conceal the barbed point of the hook do not respond adequately in presenting the barbed point when the fish strikes the lure and tension is put on the line. In such lures, the hook eye is concealed within the lure body and the hook is unable to pivot sufficiently to present the barbed point to the fish.

The patent to Margulies, U.S. Pat. No. 3,497,985, describes a fishing lure in which the barbed point of a conventional fish hook is exposed when tension is placed on a line attached to the hook eye which is concealed within the lure. Gatlyn, U.S. Pat. No. 4,020,583, is also directed to a conventional hook having a line attached to a concealed eye. Likewise, according to Schleif, U.S. Pat. No. 3,739,517, the line is attached to a concealed hook eye, as it is also in McDiarmid, U.S. Pat. No. 4,024,668. Baud, U.S. Pat. No. 3,665,634, describes a custom-made hook having an eye, also concealed within the lure, to which the line is attached.

SUMMARY OF THE INVENTION

A weedless fishing lure of the invention includes an elongated body having a forward end portion, a rearward end portion and an intermediate portion joined at one end to the forward portion and joined at the other end to the rearward portion. The lure body includes a substantially planar slot for receiving a substantially planar fish hook. The slot has elongated slit openings on opposite sides of the lure body, and a sloping wall at its forward end. The slot is connected to the outer front face of the lure by a narrow channel through the sloping wall and through the forward end portion which receives the fishing line.

A substantially planar fish hook of the invention is connected to the lure body by a resilient band around the outside of the body, adjacent the forward end portion, which passes through an open eye of the hook, holding the open eye of the hook outside the lure body. The shank portion of the hook has an arm extending substantially at right angles to the shank, substantially in the plane of the fish hook, to which the fishing line is attached. The line is attached to the arm, within the lure body, and the line is connected, through the narrow channel, to a fishing rod at its other end. Tension on the line, caused by a fish biting, causes rotation of the arm along the sloping wall of the slot to expose the barbed point.

Alternatively, two hooks may be used, one emerging from each slit opening in the lure body. In another embodiment, the end of the hook is positioned inside the lure body instead of being held on the outside of the lure body by a resilient band, as described above.

DETAILED DESCRIPTION OF THE INVENTION

In a pivoted system for a fish hook partially concealed within a fishing lure, the hook eye is restrained by a resilient band, such as an elastic band, on the outside of the lure. The fishing line is attached to an arm extending from a shank portion of the fish hook, positioned in a slot through the lure body. When tension is put on the line, the fish hook is pivoted to expose the barbed point. The lure is weedless since there are no protruding hooks to catch weeds as the lure is drawn through the water.

Figure 1:
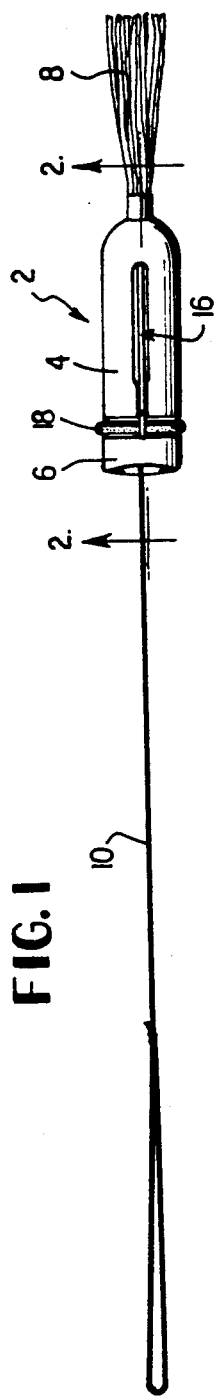
FIG. 1 is a top view of a lure of the invention.

With reference to the Figures in which like numerals represent like parts, FIG. 1 shows a fishing lure 2 of the invention. Lure 2 includes body 4 which has a head portion 6 at its forward end and a skirt portion 8 at its rearward end. Skirt 8 is optional. Line 10 enters lure 2 through an elongated narrow channel 12 in head portion 6, and is attached to fish hook 16 within the lure body.

Figure 2:
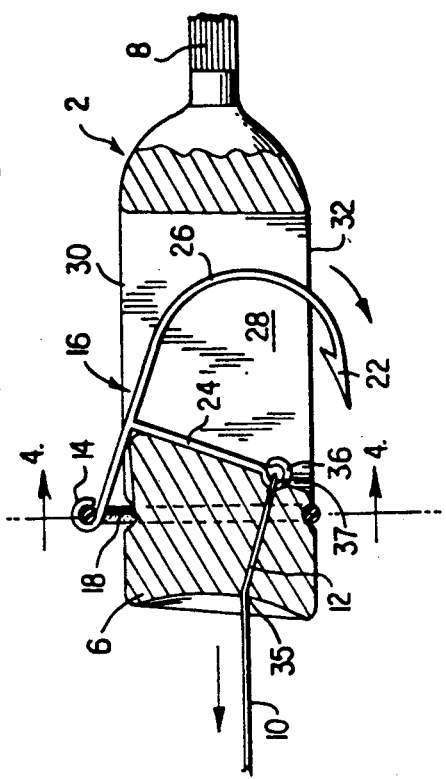
FIG. 2 is a view, partly in cross-section, taken on line 2—2 of FIG. 1, showing one embodiment of a fish hook of the invention having a barbed point concealed within the lure.
Figure 3:
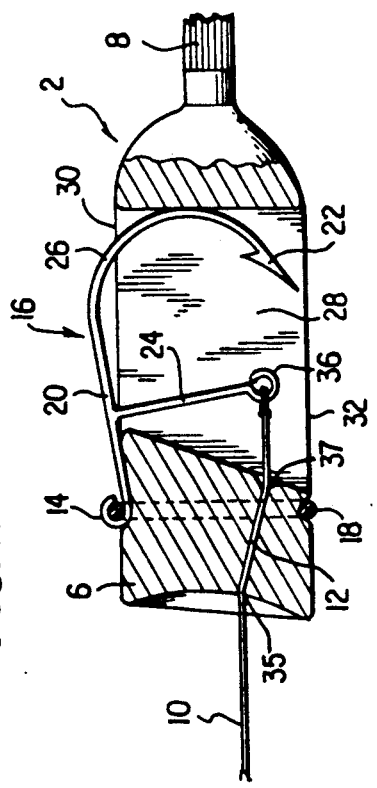
FIG. 3 is a view, similar to FIG. 2, showing the barbed point in exposed position when tension is put on the line.

FIGS. 2 and 3 illustrate eye portion 14 of fish hook 16, which is advantageously an open eye, retained on the outside of lure 2 by resilient band 18, which may be an elastic band, or other resilient band. Fish hook 16 includes eye portion 14, shank portion 20 and barbed point 22. Arm 24 extends from shank 20, in the plane of the fish hook, at an intermediate portion between eye 14 and curve 26 of fish hook 16. Arm 24 preferably extends substantially perpendicularly from shank portion 20 at a position on the shank portion adjacent the forward end of slot 28. Further, arm 24 preferably extends on the side of shank portion 20 toward barbed point 22.

Slot 28 extends through lure body 2 and is preferably a substantially planar slot having slits 30 and 32 communicating with the outside of lure body 2. Slot 28 is sized for receiving fish hook 16, as shown in the Figures. Slot 28 may be of any appropriate configuration. In a preferred configuration, forward wall 34, adjacent forward end portion 6 of lure 2, is a slanted wall. As shown in FIG. 2, arm 24 enters slot 28 at the forward end of slit 30 and barbed point 22 is concealed within slot 28, when the lure is at rest. Arm 24 lies against forward wall 34, and barbed point 22 moves through slit 32, to an exposed position, shown in FIG. 3, when tension is put on line 10. Line 10 is attached to end 36, which may be an eyelet, of arm 24 of hook 16. Line 10 extends from end 36 through aperture 37 of channel 12 to the outside. Aperture 37 is located toward the lower end of sloping wall 34, and channel 12 slopes toward the center of the lure, exiting at aperture 35, in order to provide a preferred effective angle for pivoting the hook.

Figure 4:
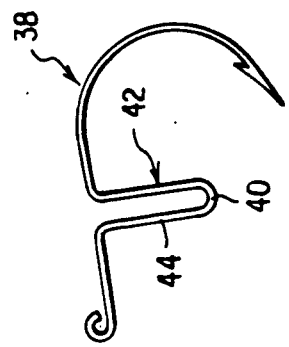
FIG. 4 is a cross-sectional view taken on line 4—4 of FIG. 3.

When a fish strikes, tension is put on line 10, arm 24 moves to lie against wall 34 and barbed point 22 emerges outside lure body 2, as shown in FIG. 3. Eye 14 is thus raised away from head portion 6, as shown in FIGS. 3 and 4, and is retained by resilient band 18. When the tension is released from line 10, resilient band 18 is relaxed and eye 14 returns to lie against lure body 2, in its original position, shown in FIG. 2. FIG. 4 shows eye 14, held away from body 2 by resilient band 18, due to tension on line 10 causing arm 24 to pivot against wall 34. Hook 16 extends through slot 28 and barbed point 22 is exposed.

Figure 5:
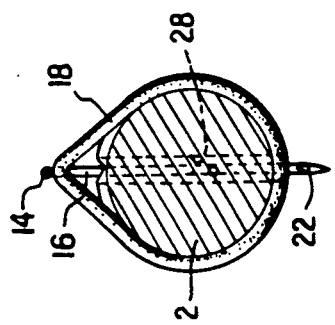
FIG. 5 is a side elevational view of another fish hook of the invention.

FIG. 5 shows another fish hook 38, which is an alternative embodiment of fish hook 16. Fish hook 38 includes loop 40 for retaining the fishing line. In use, when a fish bites, U-shaped portion 42 moves to lie with leg 44 adjacent sloping wall 34, shown in FIG. 2. Thus, when tension is put on a fishing line attached at bend 40, hook 38 is rotated in lure 2, similarly to the rotation of hook 16, as described above.

Figure 6:
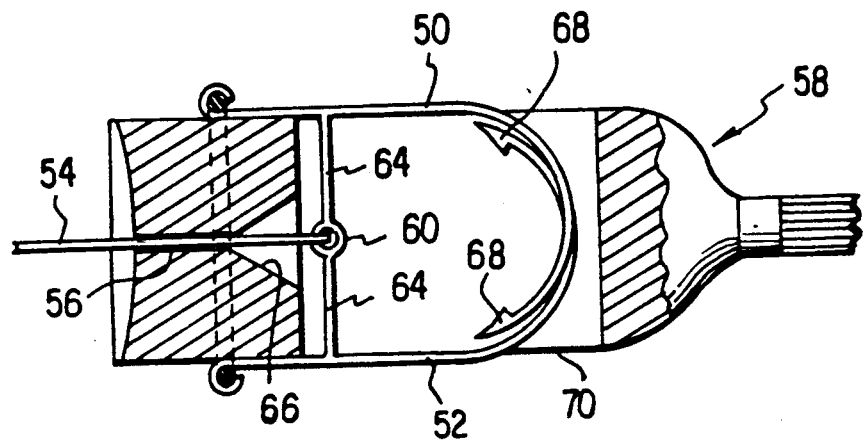
FIG. 6 is a view, similar to FIG. 2, of a further embodiment of the invention, including two fish hooks.

FIG. 6 shows another embodiment of the invention in which two hooks 50 and 52 are attached to fishing line 54 which extends through channel 56 in lure body 58. Fishing line 54 is attached to a single eye 60 as shown. Alternatively, two separate fish hooks, similar to fish hook 16 (shown in FIGS. 2 and 3), may be used and the eyes of both hooks secured together by fishing line 54. When tension is put on fishing line 54, eye 60 is pulled back to end 62 of channel 56 and arms 64 are positioned against walls 66 in lure 58. Thus, hook barb portions 68 extend through slots 70 and are exposed on the outside of lure body 58.

Figure 7:
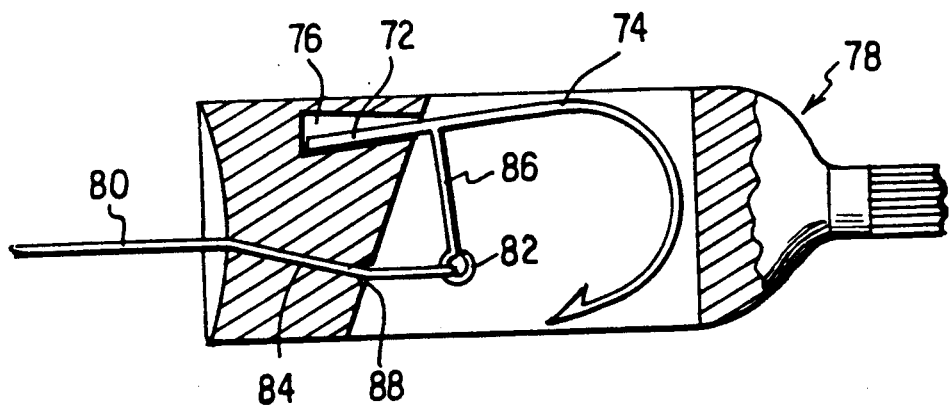
FIG. 7 is a view, similar to FIG. 2, of another embodiment of the invention, having the entire fish hook concealed within the lure body.

FIG. 7 shows a further embodiment of the invention. End 72 of hook 74 is inserted in channel 76 in lure body 78, similar to lure body 2, shown in FIG. 2. When tension is put on fishing line 80, eye portion 82 is pulled adjacent channel 84 and arm portion 86 is pulled adjacent wall 88 of lure body 78. The tension supplied by elastic band 18 in the embodiment of FIGS. 1 to 4 is supplied by the resilience of the metal or plastic material of the hook. The hook of FIG. 5 may, likewise, be adapted for use in a lure body of FIG. 7 by removing the eye portion of the hook.

While the invention has been described with respect to certain embodiments thereof, it will be appreciated that variations and modifications may be made without departing from the spirit and scope of the invention.

What is claimed is:

1. A weedless fishing lure comprising:
   an elongated body including a forward end, a rearward end and an intermediate portion joined at one end to the forward end and joined at the other end to the rearward end, and a fish hook including a first end portion, a second end portion comprising a barbed point, and a shank portion therebetween, wherein said lure body comprises:
   slot means for receiving the fish hook extending through said intermediate portion, said slot means comprising elongated openings on opposite sides of said intermediate portion;
   channel means communicating with said slot means extending through said forward end and through a leading surface of the slot means, for receiving an elongated line, wherein said elongated line is attached to said fish hook at one end and extends through said channel means for connecting to a fishing rod; and
   resilient means extending around an outer perimeter of said lure body for retaining the first end portion of the fish hook outside the lure body adjacent one of said elongated openings;
   whereby tension on the line causes rotation of the fish hook in said slot means to expose the barbed point through the other of said elongated openings in the intermediate portion of said lure.

2. A fishing lure according to claim 1 wherein said fish hook further comprises arm means extending from said shank portion for attaching said elongated line.

3. A fishing lure according to claim 2 wherein said arm means of said fish hook extends from said shank portion toward said barbed point portion.

4. A fishing lure of claim 3 wherein said arm means comprises a closed loop.

5. A fishing lure according to claim 1 wherein said resilient means extends around the lure body adjacent said forward end of said elongated opening.

6. A fishing lure according to claim 1 wherein said elongated opening adjacent said first end portion of said fish hook is shorter than said elongated opening through which said barbed point is revealed.

7. A fishing lure according to claim 6 wherein a forward wall of said slot means is inclined through the lure body whereby said arm means of said fish hook lies against said forward wall when tension is put on the line.

8. A fishing lure according to claim 7 wherein said slot means is substantially planar.

9. A fishing lure according to claim 8 wherein said channel means opens into said slot means closely adjacent the elongated opening of the slot means through which the barbed point is exposed.

10. A fishing lure according to claim 9 wherein said arm means of said fish hook to which the line is attached lies adjacent the opening of the channel means into the slot means when tension is put on the line.

11. A fishing lure according to claim 1 wherein the shank portion of the fish hook adjacent the first end portion is retained outside the lure body when the barbed point is concealed in the body.

12. A fishing lure according to claim 1 further comprising a skirt attached to the rearward end of the lure body.

13. A weedless fishing lure comprising:
   an elongated body including a forward end, a rearward end and an intermediate portion joined at one end to the forward end and joined at the other end to the rearward end, and a fish hook including a first end portion, a second end portion comprising a barbed point, and a shank portion therebetween, wherein said lure body comprises:
   slot means for receiving the fish hook extending through said intermediate portion, said slot means comprising elongated openings on opposite sides of said intermediate portion;
   first channel means communicating with said slot means extending through said forward end and through a leading surface of the slot means, for receiving an elongated line, wherein said elongated line is attached to said fish hook at one end and extends through said channel means for connecting to a fishing rod; and
   second channel means in said lure body for retaining the first end portion of the fish hook adjacent one of said elongated openings;
   whereby tension on the line causes rotation of the fish hook in said slot means to expose the barbed point through the other of said elongated openings in the intermediate portion of said lure.

* * * * *